//
2,946,573

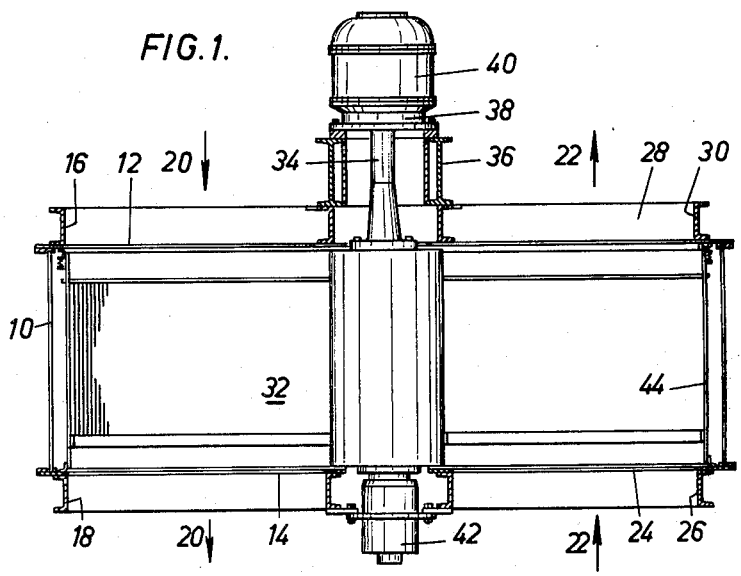
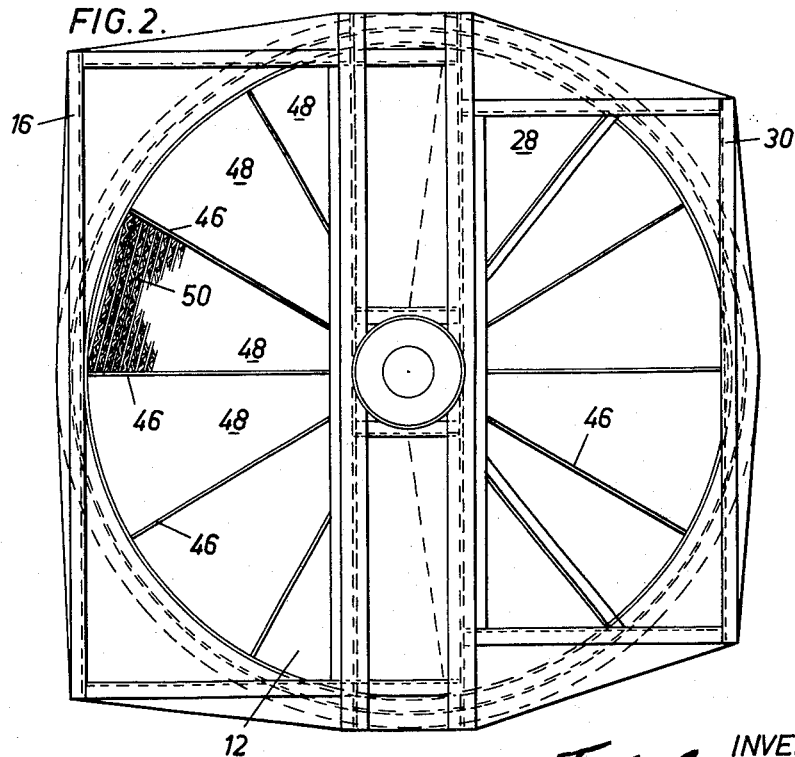

ROTARY REGENERATIVE HEAT EXCHANGERS

Teodor Immanuel Lindhagen and Tor Axel Odman, Stockholm, Sweden, assignors to Svenska Rotor Maskiner Aktiebolag, Nacka, Sweden, a corporation of Sweden Filed June 18, 1956, Ser. No. 591,884

9 Claims. (Cl. 257—270)

The present invention relates to regenerative heat exchangers for effecting heat exchange between gaseous media, and has particular reference to such heat exchangers of the well known Ljungström type in which a rotor is mounted to rotate with a portion of the rotor passing through a first gas channel through which hot gas from which heat is to be absorbed flows while another portion of the rotor passes through a second gas channel for conducting a relatively cold gas to which heat absorbed from the hot gas is supplied. The rotors of such devices are filled with so-called regenerative mass, usually in the form of a plate structure providing a multiplicity of passages extending axially through the rotor and providing a large surface area for absorption of heat by the regenerative mass as it passes through the hot gas channel and the rejection of the absorbed heat to the cold gas as it passes through the cold gas channel.

From the standpoint of size, weight and cost it is highly desirable to provide a structure having a high coefficient of heat transfer between the gaseous media and the heat exchanging elements constituting the regenerative mass, since the higher the value of such coefficient the smaller the area of heat exchange surface required for the transfer of a given amount of heat per unit time. As is well known, the coefficient of heat transfer between a gaseous medium and a solid body with which it is in contact is greater when the flow of the gas is turbulent rather than laminar and generally increases with increase in the degree of turbulence of the flow of the gas. Thus, from the standpoint of obtaining the highest coefficient of heat transfer, it would be desirable to design the heat exchange elements for apparatus of the kind under discussion to produce a high degree of turbulence in the flow of the gases passing through the channels in the rotor. However, as is equally well known, resistance to flow of gas through a channel is increased by increased turbulence, with resultant increased pressure drop through the passage and increase in the power required in order to maintain gas flow at a given rate through the passage.

Therefore, for apparatus of the kind to which the present invention is directed it is of the utmost importance to provide heat exchange elements forming passages resulting in obtaining the highest possible coefficient of heat transfer for a given value of resistance to flow or pressure drop through the passages. The coefficient of heat transfer obtained, related to the resistance to flow required to obtain it, is conveniently briefly referred to as the "quality figure" for the apparatus, the value of which figure is increased by increase in the value of the coefficient of heat transfer and the value of which is decreased by an increase in resistance to flow of the gaseous media through the apparatus.

One of the principal uses for rotary regenerative heat exchangers of the kind under consideration is and has been for many years as air preheaters for preheating the air supplied for combustion purposes to the furnaces of power boilers, the waste flue gases from the boilers being used as the heating medium. For this use air preheaters for large power boilers are built in very large sizes, some units having rotors in excess of twenty-five feet in diameter, weighing up to two hundred and fifty tons and provided with heating elements having tens of thousands of square feet of heating surface and shaped to form thousands of passages substantially axially of the rotor for flow of the gaseous heat exchanging media.

From the foregoing it will immediately be apparent that the slightest improvement in the form and arrangement of the heating elements and giving even a very minor increase in the value of the quality figure, is of great practical commercial importance and over a period of several decades a great deal of research and development work has been carried on which has resulted in a multitude of proposals for different designs of heating elements and which has brought the art to a highly developed state. From the practical commercial standpoint, the most satisfactory and efficient element structures heretofore developed and employed in the majority of preheaters now in use comprise thin metal plates spaced apart by parallel ridges usually formed on alternate plates so that between each two adjacent plates a number of relatively wide and shallow channels extending from end to end of the rotor are formed for flow of the gaseous media. Additionally either every one of the plates or every other plate is formed with diagonally disposed shallow grooves or undulations which causes the several columns of gas flowing through the channels to take generally helical paths of flow that are effective to bring all portions of the body of gas into good heat exchanging contact with the plate elements forming the walls of the passages without creating undue turbulence of the kind that is productive of high resistance to flow of the gas. The best examples of such prior art structures, which as noted above have gone into the widest commercial use, are disclosed in U.S. Patents No. 2,023,965 granted December 10, 1935, on the application of A. Lysholm and No. 2,596,642 granted May 13, 1952, on the application of G. K. W. Boestad.

It is the general object of the present invention to improve element structure for regenerative heat exchangers which shall be simple and relatively inexpensive to construct, install and maintain which may readily be cleaned and which as a most important factor will be productive of a heat exchanging apparatus having a higher quality factor than those of the best known prior art. To this end the invention contemplates the use of wire mesh instead of part (or in some cases even all) of the plate structure heretofore employed to define the walls or boundaries of the several gas channels.

The manner in which the invention may be carried into effect with preferred forms of structure will best be understood from a consideration of the ensuing portion of this specification, taken in conjunction with the accompanying drawings forming a part hereof, and in which:

Fig. 1 is a more or less diagrammatic central vertical cross section through a Ljungström type rotary regenerative preheater equipped with heat exchange element structure embodying the invention;

Fig. 2 is a plan view of the apparatus shown in Fig. 1;

Figure 3:
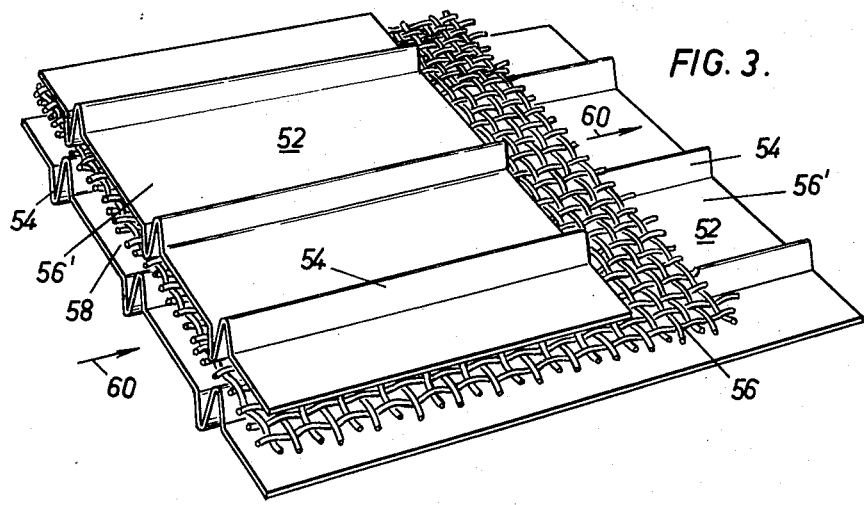
Fig. 3 is a perspective view on large scale of the element structure indicated in Fig. 2.

Referring now to the drawings, the heat exchanger comprises an outer stationary casing structure 10, divided to provide side-by-side passages for the gaseous heat exchanging media. One passage may extend from an inlet port 12 in the top plate of the casing to an outlet port 14 located in the bottom plate of the casing. As shown in the drawing, a flanged duct 16 adapted to be connected to a conduit for delivering gas such as flue gas to the apparatus communicates with port 12 and a similar duct 18 leads from the outlet port 14. If the apparatus is employed as an air preheater counter current flow of the gas and air is desirable as indicated by the arrows 20 and 22, the air passage through the casing extending from inlet port 24 in the bottom plate of the casing and with which the flanged duct 26 is associated, to the outlet port 28 in the top plate of the casing from which the flanged duct 30 extends. Rotatably mounted within the casing and extending into both passages is the rotor indicated generally at 32. Rotor 32 comprises a center post 34 suspended at its upper end from a suitable framework 36 carrying a thrust bearing indicated at 38 and further carrying a motor and suitable gearing for turning the rotor, indicated generally at 40. At its lower end the center post is guided by the radial bearing 42. The rotor has an outer cylindrical shell 44 connected to the center post 34 by a plurality of radial partitions 46 providing between them a number of sector-like compartments 48, for the reception of the regenerative mass (indicated generally at 50 in Fig. 2) and comprised of the heat exchange elements providing the multiplicity of small channels for the flow of the gases through the rotor. The general construction of casing and rotor just described is conventional and well known and therefore need not be described in further detail herein.

Referring now more particularly to Fig. 3 there is shown therein on larger scale and in perspective view the element structure of which the regenerative mass 50 is comprised in accordance with one example of the present invention. As seen in this figure, these elements comprise plates (indicated generally at 52) formed with parallel Z-shaped ridges 54 providing spacing means for spacing the plate over their entire areas, except along the lines formed by the crests of the ridges, away from the plane elements 56 consisting of woven wire mesh or net, which in the example illustrated are arranged so that the assembly or "pack" of heat exchange elements is comprised of ridged plate elements, providing the desired spacing, alternating with plane wire mesh elements. In the example shown, the portions 56' of the plates 52 between the spacing ridges 54 are plane, so that the gas flowing through the relatively wide and shallow channels 58 in the general direction of arrows 60, does not have any helical character of flow induced upon it as in the previously mentioned Lysholm and Boestad disclosures. As will be apparent from the drawing one of the wide sides of each channel 58 is formed by a plane plate surface while the opposite and relatively closely adjacent wide side of the channel consists of wire mesh. Neither of these side surfaces tend to impart lateral motion to the gas column to produce a helical path of flow to the gas, and it is further to be noted that the wire mesh provides a perforated wall between channels disposed on opposite sides of the wire mesh element, so that gas entering a given channel is not necessarily confined to the same channel throughout its passage from end to end of the rotor but may flow to a contiguous channel through the perforate mesh wall of the channel originally entered by the gas.

Wire mesh of the kind contemplated by the present invention has a substantially larger surface area for contact with the gases per square foot or other unit of area of the element than does a like unit of area of plate, and for that reason the use of mesh rather than plate may logically be expected to result in a higher rate of heat transfer per unit area of wall of the gas passage. Such is the case. On the other hand, the use of wire mesh rather than plate surface may logically be expected to very materially increase the resistance to flow of the gas for any given set of conditions, with the net result of no improvement or even decrease in the value of the quality factor of the apparatus. The use of mesh in accordance with the principles of the invention has, however, from actual test experience, been found to produce wholly unpredictable and very much improved results so far as the quality figure for the apparatus is concerned. The precise reason for the improvement is not subject to detailed mathematical analysis, but from actual test it is evident that while the use of mesh does increase the resistance to gas flow as reflected in terms of pressure drop per unit length of gas passage, such increase is not comparable to the increase in the heat transfer per unit length of passage. Consequently, through use of mesh, one has the possibility of either obtaining the same heat transfer with a much shorter rotor than would be required with an all plate structure, thereby materially reducing the length of the gas channels and consequently the overall pressure drop to increase the value of the quality figure, or, utilizing a rotor having gas channels of the same length as those of a comparable rotor having an all plate structure, obtaining a much greater heat transfer rate than corresponds to the increase in the overall pressure drop, with consequent improvement in quality figure.

Figure 6:
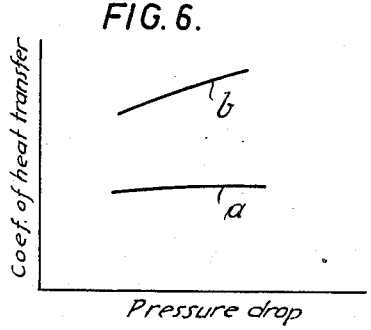
Fig. 6 is a diagram illustrative of the improvement with respect to the prior art obtainable by use of this invention.

By reference to Fig. 6, in which the coefficient of the heat transfer is plotted against pressure drop, the performance characteristic of an airpreheater equipped with element structure of the kind above described, as compared with a comparable preheater equipped with plate element structure representative of substantially the best and most widely used prior art (the latter being shown in Fig. 6 of the aforesaid Lysholm patent) is illustrated. In the drawing, curve $a$ represents the performance of elements as shown in the Lysholm patent, while curve $b$ is representative of the performance obtained with elements as disclosed in Fig. 3 of the present application. Curves $a$ and $b$ are plotted from actual test results which were obtained from comparable test packs of elements. In the all plate structure, all of the plates were 0.7 mm. thick, the ridged plates being provided with parallel ridges spaced 75 mm. from crest to crest of adjacent ridges and with the crests of the ridges 6 mm. from the plane of the plate. The intervening obliquely grooved or undulated plates were provided with grooves 2.9 mm. in depth extending at an angle of approximately 30° with respect to the longitudinal axes of the gas channels formed between the ridges. In the pack embodying the present invention as disclosed in Fig. 3 hereof, the thickness and dimensions of the ridged plates were the same as those used in the all plate pack, with the intervening wire mesh elements consisting of square woven mesh of wire 1.4 mm. in diameter woven to provide mesh 5.08 mm. square (5 mesh per inch). It will thus be evident that the test packs were completely comparable. It will also be evident that the invention is not limited to any specific dimensional values for the elements used, since for different specific installations wide variations in gas quantities and velocities, gas temperatures and temperature differences and other factors, all of which influence the design, have to be taken into account.

Figure 4:
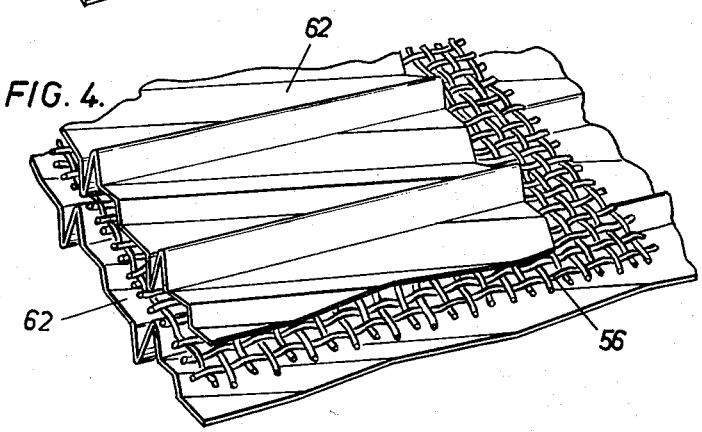
Fig. 4 is a view similar to Fig. 3 showing a different form of element structure.

Also, it is to be noted that while for explaining the nature of the invention and the improved results obtainable through its use, one particular embodiment of element pack has been described in detail, the invention is not limited to any particular design and arrangement of elements. Thus in forms of packs comprising alternating plate and mesh elements the specific design of the plate elements may vary widely both as to surface configuration and the means employed for effecting the spacing of adjacent elements. For example, the plate elements 52 may be provided with oblique undulations 62 as seen in Fig. 4 to induce helical flow of the gas columns, but since the forming of undulated plates is more expensive than the production of plane plates and element packs employing the latter have demonstrated actual improvement of very material value, other and more expensive forms to plate structure will apparently not be justified.

Figure 5:
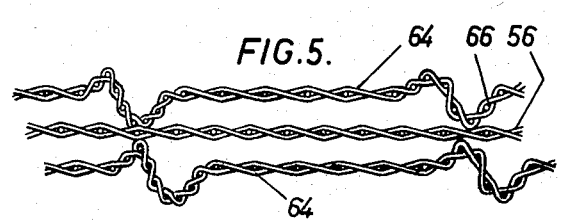
Fig. 5 is a cross section of still another form of element structure.

Further, it will be understood that the invention is not limited in its scope to element packs consisting of alternate mesh and plate elements but may in some instances be composed entirely of mesh elements. One such form of all mesh construction is illustrated in Fig. 5, wherein the plane mesh elements 56 are arranged alternately with and spaced by mesh elements 64 bent at spaced intervals to provide the spacing ridges 66 which function to keep adjacent elements in spaced relation except for the lines of contact along the crests of the spacing ridges. Although separate spacing members may be inserted between adjacent heat exchange elements to keep the latter in desired spaced relation, such construction, involving additional parts, will ordinarily be found to be more expensive and therefore less desirable than constructions in which the desired spacing is secured by the simple expedient of forming spacing projections of desired configuration on the elements themselves.

While for purposes of illustration the wire mesh elements shown herein are formed from woven wire, it will be evident that other varieties of mesh material may be used.

From the foregoing it will be apparent that many changes may be made in the specific form and arrangement of the elements, as well as in dimensional relationships, and the invention is accordingly to be understood as embracing all structures falling within the scope of the appended claims.

This application is a continuation-in-part application replacing our copending application Serial No. 161,351, filed May 11, 1950, now abandoned.

We claim:

1. A heat exchanger comprising a casing structure having inlet and outlet ports for conducting to and from the casing different streams of gaseous fluid at different temperature between which heat is to be exchanged, a rotor mounted to rotate within said casing, said rotor having regenerative mass located therein to traverse said streams in alternation to absorb heat from the stream of higher temperature and to reject the absorbed heat to the stream of lower temperature, said mass comprising one or more packs each composed of a plurality of juxtaposed heat exchange elements, at least every second one of said elements comprising wire mesh, said elements being substantially parallel with the direction of flow of the streams of gaseous fluid through the rotor, means parallel with the direction of flow of said streams of gaseous fluid for laterally spacing away from each other substantially the entire surface areas of adjacent elements to provide between each two adjacent elements a series of relatively wide and shallow open channels extending axially of the rotor and substantially parallel with the direction of flow of the gaseous fluid therethrough, at least every second of said regenerative mass elements constituting one of the wider side walls of said channels constituting wire mesh.

2. Apparatus as defined in claim 1 in which every second one of said elements is of wire mesh and the intervening elements are of plate.

3. Apparatus as defined in claim 2 in which spacing means is formed by a part of each of the plate elements for maintaining the mesh elements on either side thereof in spaced relation thereto.

4. Apparatus as defined in claim 3 in which said mesh elements are substantially plane.

5. Apparatus as defined in claim 3 in which the surface of the plate elements between the spacing means is substantially plane.

6. Apparatus as defined in claim 3 in which the surface of the plate elements between the spacing means is undulated to provide a plurality of shallow grooves extending obliquely with respect to the longitudinal axes of said channels.

7. Apparatus as defined in claim 1 in which each of said elements is of wire mesh.

8. Apparatus as defined in claim 7 in which at least every second element is bent at spaced intervals out of the general plane of the element to provide spacing means for holding an adjacent element in spaced relation.

9. Apparatus as defined in claim 8 in which the elements located between the bent elements are substantially plane.

References Cited in the file of this patent

UNITED STATES PATENTS

| | | |
|---|---|---|
| 902,812 | Goetz et al. | Nov. 3, 1908 |
| 2,023,965 | Lysholm | Dec. 10, 1935 |
| 2,157,744 | Welty | May 9, 1939 |
| 2,374,608 | McCollum | Apr. 24, 1945 |
| 2,438,851 | Gates | Mar. 30, 1948 |
| 2,596,642 | Boestad | May 13, 1952 |